L. J. PERKINS.
PNEUMATIC VEHICLE GEAR.
APPLICATION FILED JAN. 12, 1910.
960,579.
Patented June 7, 1910.
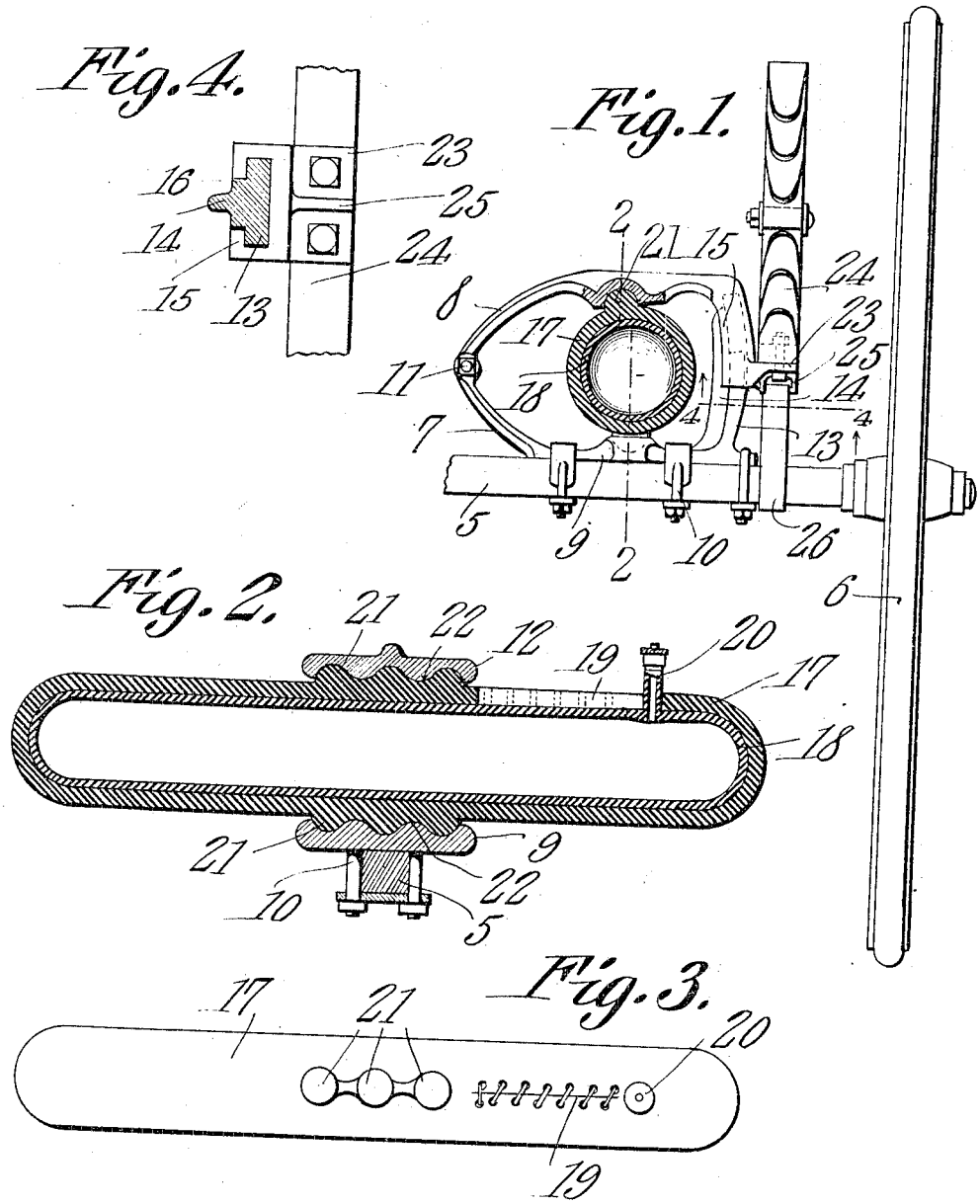

UNITED STATES PATENT OFFICE.

LOUIS J. PERKINS, OF LEWISTON, IDAHO.

PNEUMATIC VEHICLE-GEAR.

960,579.  Specification of Letters Patent.  Patented June 7, 1910.

Application filed January 12, 1910. Serial No. 537,720.

*To all whom it may concern:*

Be it known that I, LOUIS J. PERKINS, a citizen of the United States, residing at Lewiston, in the county of Nez Perce and State of Idaho, have invented a new and useful Pneumatic Vehicle-Gear, of which the following is a specification.

It is the object of the present invention to provide an improved cushion gear for vehicles of that type designed to obviate the use of pneumatic tires upon the wheels of the vehicle.

One aim of the invention is to provide a compact and simple device of this class and one which will not be unsightly nor in the way.

The present device embodies, as a cushion element, a pneumatic body which is interposed between two relatively movable members and it is contemplated that this body be reinforced at the point of contact of the said members therewith so that it will not be liable to become worn through and consequently become useless.

With the above and other objects in view, the invention consists in the construction and arrangement of parts shown in the accompanying drawings in which—

Figure 1 is a view partly in elevation and partly in section of one of the devices applied to a vehicle axle. Fig. 2 is a vertical longitudinal sectional view therethrough on the line 2—2 of Fig. 1. Fig. 3 is a plan view of the cushion element; and Fig. 4 is a horizontal section on the line 4—4 of Fig. 1 looking in the direction indicated by the arrows.

In the drawings, the vehicle axle is indicated by the numeral 5 and has mounted thereon the usual wheel 6 which may or may not be provided with the pneumatic tire according to the wishes of the owner of the vehicle. The device embodying the present invention includes in its structure, two connected members one of which is movable with respect to the other and of these members, one is indicated by the numeral 7 and the other by the numeral 8. The member 7 includes a body portion 9 which is practically flat and is disposed and secured upon the axle 5 by means of suitable clips or other securing devices 10. From this body portion, the member extends upwardly in a curve and is pivotally connected as at 11 to a corresponding portion of the member 8. The member 8 includes a body portion 12 which is substantially of the same form as the corresponding portion of the member 7 and the member 7 is formed with an upstanding flat arm 13 having formed thereon a reinforcing rib 14. This arm 13 is curved in an arc struck with the pivot 11 as a center and the body of the member 8 is formed with a downwardly projecting arcuate box 15 which slidably receives the upstanding arm 13 and is slotted as at 16 to receive the rib 14. Inasmuch as both the arm and the box are struck on the arc of a circle of which the pivot 11 is a center, the elements will have sliding movement when the member 8 is swung up or down upon its pivot 11. It will be understood of course that the reception of the arm 13 in the box 15 serves as a means for guiding the section 8 when moving, and that displacement of the said section with respect to the section 7 is prevented.

The cushion element of the structure is in the nature of an elongated hollow body 17 in which is inserted an inflated body 18, said body 18 filling the said body 17 as illustrated in Figs. 1 and 2 of the drawings. It will be observed that the body 17 is split as at 19 for the insertion of the body 18 and this latter body is provided with the usual valve 20 by which it may be inflated. It will be observed that the body 17 is formed upon its upper and upon its under side at a point substantially midway between its ends, with protuberances indicated by the numeral 21; and it will further be observed that the protuberances upon the upper side of the body are not in the same vertical plane as the protuberances upon the under side thereof, so that when the member 8 moves downwardly under pressure, it will not be liable to force or tend to force the cushion element from position between it and the member 7. To further insure against this accidental displacement of the cushion element, the opposing faces of the members 7 and 8 or more specifically the body portions of these members, are formed with depressions 22 to receive the protuberances and this seating of the protuberances in the said depressions will not only prevent the displacement of the cushion element laterally, but also prevent its displacement in the direction of its length. It will be understood of course, that normally the cushion element tends to hold the member 8 away from the member 7 and that downward swinging of the member 8 must be against the expansive force of the cushion element and must depress the same to a greater or less degree.

The downwardly projecting box 15 is formed at its lower end with a lateral shelf 23 upon which rests and is secured a bolster spring 24 in turn supporting the vehicle body (not shown). The shelf 23 is formed with a loop 25 through which is passed a strap 26 passing about the axle 5. It will be understood of course that the weight of the vehicle body and its contents is imposed upon the bolster springs 24 and that the cushion elements are compressed to a greater or less degree depending upon the weight. It will also be understood that when the springs are relieved of weight, they will allow upward swinging movement of the member 8 and a consequent expansion of the inflated cushion element. The strap 26, it will be understood, limits the separation of the member 8 from the member 7 so that the cushion element cannot become dislodged from its position between the members 7 and 8.

From the foregoing it will be seen that there is provided an extremely simple and compact device of this type which is applicable to practically any vehicle and will obviate the necessity of providing tires upon the wheels thereof.

What is claimed is:—

1. In a device of the class described, connected relatively movable members, one of said members being axle supported and the other member being adapted for the support of a vehicle body, the first mentioned member being formed with an upstanding arcuate member and the second mentioned member being formed with a downwardly projecting arcuate member receiving the upstanding member, whereby to relatively guide the sections when moving, and a pneumatic cushion interposed between said members.

2. In a device of the class described, a fixed member, a member pivoted to the fixed member, the first mentioned member being axle supported, the said first mentioned member having an upstanding arcuate arm, the second mentioned member having a depending arcuate hollow arm receiving the first mentioned arm, a pneumatic cushion arranged between the members, the last mentioned member being formed with a lateral shelf for the support of a vehicle spring, a loop formed beneath the shelf and upon the said second mentioned member, and an axle engaging strap secured through the loop.

In testimony that I claim the foregoing as my own, I have hereto affixed my signature in the presence of two witnesses.

LOUIS J. PERKINS.

Witnesses:
SAMUEL A. ROE,
EUGENE SHIPLER.